US012042803B2

(12) United States Patent
Schmidt et al.

(10) Patent No.: US 12,042,803 B2
(45) Date of Patent: Jul. 23, 2024

(54) HYDROCYCLONE

(71) Applicant: Vulco S.A., Santiago (CL)

(72) Inventors: Mark Schmidt, Wabush (CA); Eduardo Cepeda, Santiago (CL); Jorge Lagos, Santiago (CL)

(73) Assignee: VULCO S.A. (CL)

( * ) Notice: Subject to any disclaimer, the term of this patent is extended or adjusted under 35 U.S.C. 154(b) by 437 days.

(21) Appl. No.: 17/415,701

(22) PCT Filed: Dec. 12, 2019

(86) PCT No.: PCT/IB2019/060690
§ 371 (c)(1),
(2) Date: Jun. 17, 2021

(87) PCT Pub. No.: WO2020/128736
PCT Pub. Date: Jun. 25, 2020

(65) Prior Publication Data

US 2022/0048047 A1 Feb. 17, 2022

(30) Foreign Application Priority Data

Dec. 21, 2018 (GB) ...................................... 1821140

(51) Int. Cl.
*B04C 5/081* (2006.01)
*B04C 5/085* (2006.01)
(Continued)

(52) U.S. Cl.
CPC ................ *B04C 5/081* (2013.01); *B04C 5/14* (2013.01); *B04C 5/28* (2013.01); *B04C 5/085* (2013.01)

(58) Field of Classification Search
CPC .. B04C 5/081; B04C 5/14; B04C 5/28; B04C 5/085
See application file for complete search history.

(56) References Cited

U.S. PATENT DOCUMENTS 3,902,601 A 9/1975 Townley
4,737,271 A * 4/1988 Childs ....................... B04C 5/13 210/512.1
(Continued)

FOREIGN PATENT DOCUMENTS

CN 202064929 U 12/2011
CN 202137063 U 2/2012
(Continued)

*Primary Examiner* — Krishnan S Menon
(74) *Attorney, Agent, or Firm* — Morriss O'Bryant Compagni Cannon, PLLC.

(57) ABSTRACT

A part-conical section (20,22) for use as part of a separation chamber (14) of a hydrocyclone (10) is described. The part-conical section comprises: an upper end defining internal and external diameters and including an upper mount (44,48); a lower end defining smaller internal and external diameters than the upper end, and including a lower mount (46,50); and a side-wall (26) defining an internal passageway (28) along a fluid transport axis (30) and an external surface. The internal passageway extends from the upper end to the lower end and defines a radially-inward tapering portion with respect to the fluid transport axis, and a non-inwardly-tapering portion with respect to the fluid transport axis. The tapering portion extends from the upper end to the non-inwardly-tapering portion, and the non-inwardly-tapering portion extends from a narrow end of the tapering portion to the lower end. A spigot (24) and a hydrocyclone (10) are also described.

19 Claims, 5 Drawing Sheets

(51) Int. Cl.

| | |
|---|---|
| ***B04C 5/14*** | (2006.01) |
| ***B04C 5/28*** | (2006.01) |

(56) References Cited

U.S. PATENT DOCUMENTS

| | | | | |
|---|---|---|---|---|
| 7,185,765 | B2 * | 3/2007 | Hakola | B04C 5/13 209/734 |
| 2005/0155916 | A1 | 7/2005 | Wlodzimierz et al. | |

FOREIGN PATENT DOCUMENTS

| | | | |
|---|---|---|---|
| CN | 205042628 | U | 2/2016 |
| WO | 2002076622 | A1 | 10/2002 |
| WO | 2010085331 | A1 | 7/2010 |

* cited by examiner

| Option No. | Angle A ° | Angle B° | Length C (mm) | Length D (mm) | % C to D (C / D) | Length E (mm) | Length F (mm) | Length G (mm) | % F to G (F / G) |
|---|---|---|---|---|---|---|---|---|---|
| 1 | 2.5 | 3 | 8.9 | 10.9 | 81.65% | 245 | 50 | 295 | 17% |
| 2 | 2 | 3 | 9.4 | 14 | 67.14% | 270 | 25 | 295 | 8.50% |
| 3 | 6 | 7 | 21.1 | 30.3 | 69.63% | 533 | 33 | 566 | 5.80% |
| 4 | 3.5 | 5 | 21.7 | 36.1 | 60.11% | 560 | 30 | 590 | 5.00% |
| 5 | 4 | 5 | 23.4 | 37.3 | 62.73% | 806 | 49 | 855 | 5.70% |
| 6 | 4.5 | 5 | 38.8 | 46.8 | 82.90% | 925 | 30 | 955 | 3.14% |
| 7 | 7 | 9 | 23.9 | 40.8 | 58.57% | 489 | 71 | 560 | 12.67% |
| 8 | 8 | 9 | 31.3 | 40.9 | 76.52% | 555 | 45 | 600 | 7.50% |
| 9 | 8.2 | 9 | 36.5 | 47.5 | 76.84% | 812 | 60 | 872 | 6.90% |
| 10 | 8.2 | 9 | 39 | 45.3 | 46.09% | 482 | 60 | 542 | 11.10% |
| 11 | 7.6 | 9 | 48.9 | 62.4 | 78.36% | 568 | 182 | 750 | 24.30% |
| 12 | 8.5 | 9 | 41.1 | 48 | 85.62% | 840 | 80 | 920 | 8.70% |

| Outlet End Diameter 194 (mm) | Angle C (degrees) | Collar Portion Wall Thickness 192 (mm) | Second Internal Portion 180 (mm) | Internal Passage Length 190 (mm) | Ratio of 180 to 190 |
|---|---|---|---|---|---|
| 130 | 14.6 | 110 | 157 | 517 | 30% |
| 140 | | 105 | 167 | | 32% |
| 150 | | 100 | 177 | | 34% |
| 160 | | 95 | 187 | | 36% |
| 170 | | 90 | 197 | | 38% |
| 180 | | 85 | 207 | | 40% |
| 190 | | 80 | 217 | | 42% |
| 200 | | 75 | 227 | | 44% |
| 210 | | 70 | 237 | | 46% |
| 220 | | 65 | 247 | | 48% |
| 230 | | 60 | 257 | | 50% |
| 240 | | 55 | 267 | | 52% |
| 250 | | 50 | 277 | | 54% |
| 260 | | 45 | 287 | | 56% |

HYDROCYCLONE

The invention relates to improvements in or relating to a hydrocyclone, and particularly, but not exclusively, to parts for a hydrocyclone.

Hydrocyclones are used for separating suspended matter carried in a flowing liquid, such as a mineral slurry, into two discharge streams by creating centrifugal forces within the hydrocyclone as the liquid passes therethrough.

A typical hydrocyclone comprises a main body defining an upper chamber and a frusto-conical separation chamber extending from the upper chamber. The upper chamber typically has the greatest cross-sectional dimension of the hydrocyclone parts, and includes a helical formation on the inside thereof. The frusto-conical separation chamber may comprise a plurality of frusto-conical sections coupled end to end and terminating with a spigot at the underflow outlet. The frusto-conical sections and spigot typically define a passageway of continuously narrowing diameter from the cylindrical chamber to the underflow outlet.

A feed inlet is usually generally tangential to the axis of the separation chamber and is disposed at the upper chamber. An overflow outlet is centrally located at an upper end of the upper chamber.

The feed inlet is configured to deliver the slurry (liquid containing suspended matter) into the helical formation in the upper chamber and from there it flows into the hydrocyclone separation chamber, and the arrangement is such that the heavy (for example, denser and coarser) matter tends to migrate towards the outer wall of the chamber and towards and out through the centrally located underflow outlet. The lighter (less dense or finer particle sized) material migrates towards the central axis of the chamber and out through the overflow outlet. Hydrocyclones can be used for separation by size of the suspended solid particles or by particle density. Typical examples include solids classification duties in mining and industrial applications.

The portions of a hydrocyclone that are most subject to wear due to the slurry being separated are those parts comprising the frusto-conical separation chamber (that is, the frusto-conical sections and the spigot). It is desirable to increase the useful life of these components by reducing the amount of wear that they are susceptible to.

According to a first aspect there is provided a part-conical section for use as part of a separation chamber of a hydrocyclone, the part-conical section comprising: an upper end defining internal and external diameters and including an upper mount; a lower end defining smaller internal and external diameters than the upper end, and including a lower mount; a sidewall defining an internal passageway along a fluid transport axis and an external surface, the sidewall thickness at the upper end being narrower than the sidewall thickness at the lower end; wherein the internal passageway extends from the upper end to the lower end and defines a radially-inward tapering portion with respect to the fluid transport axis, and a non-inwardly-tapering portion with respect to the fluid transport axis, the tapering portion extending from the upper end to the non-inwardly-tapering portion, and the non-inwardly-tapering portion extending from a narrow end of the tapering portion to the lower end.

The upper mount may be used for coupling the part-conical section to either another part-conical section or a fluid input portion of a hydrocyclone.

The lower mount may be used for coupling the part-conical section to either another part-conical section or a spigot of a hydrocyclone.

The non-inwardly-tapering portion may comprise a generally uniform diameter, such as a cylindrical portion.

In some embodiments, the non-inwardly-tapering portion comprises at least 3% of the length of the internal passageway along the fluid transport axis. In other embodiments, the non-inwardly-tapering portion comprises at least 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30% of the length of the internal passageway along the fluid transport axis.

The upper end refers to the orientation of that end when in use as part of a hydrocyclone. In use, the upper end provides the inlet for the hydrocyclone, and the lower end provides the underflow outlet or a coupling to another part-conical section.

In one embodiment, the sidewall external surface optionally tapers continuously from the upper end to the lower end. Alternatively, the sidewall external surface optionally comprises one or more steps from the upper end to the lower end.

The sidewall thickness at the upper end being less than the sidewall thickness at the lower end ensures that increased wear thickness is provided where most wear is expected (i.e. the lower end), and reduced thickness (and therefore reduced cost) is provided where least wear is expected (i.e. the upper end).

The sidewall thickness optionally increases as the sidewall external surface tapers from the upper end to the lower end by at least 5%, preferably at least 8%; in some embodiments between 8% and 66%, depending on the initial thickness of the sidewall.

In some embodiments, the angle between the sidewall external surface and a line parallel to the fluid transport axis (angle A) is less than the angle between the radially-inward tapering portion of the internal passageway and the line parallel to the fluid transport axis (angle B), thereby ensuring that the sidewall thickness increases as the sidewall extends towards the lower end.

Angle A may be selected from the range of 2 degrees to 9 degrees.

Angle B may be selected from the range of 3 degrees to 10 degrees.

The part-conical section may comprise an elastomer sidewall, a ceramic sidewall, a metal or alloy sidewall, a composite sidewall, or the like. Alternatively or additionally, the part-conical section may comprise a ceramic lining, an elastomer lining, a composite lining, or the like.

According to a second aspect there is provided a spigot for use as part of a separation chamber, the spigot comprising: an upper end defining an internal diameter and including an upper mount for coupling the spigot to a section of a hydrocyclone; an underflow outlet end having a smaller internal diameter than the upper end; a spigot sidewall defining an internal passageway along a fluid transport axis and an external surface; wherein the internal passageway extends from the upper end to the underflow outlet end and defines: (i) a radially-inward tapering portion with respect to the fluid transport axis, and (ii) a non-inwardly-tapering portion with respect to the fluid transport axis, the tapering portion extending from the upper end to the non-inwardly-tapering portion, and the non-inwardly-tapering portion extending from a narrow end of the tapering portion to the underflow outlet end; wherein the non-inwardly-tapering portion comprises at least 15% of the length of the internal passageway along the fluid transport axis.

In other embodiments, the non-inwardly-tapering portion comprises at least, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%. 56%, 57%, 58%, 59%. 60%, 61%, 62%, 63%, 64% of the total length (which may be the length of the radially-inward tapering portion and the non-inwardly-tapering portion combined) of the internal passageway along the fluid transport axis.

In some embodiments, the angle between the spigot radially-inward tapering portion of the internal passageway and the line parallel to the fluid transport axis (angle C) is at least 8 degrees.

In other embodiments, angle C may be selected from the range of 8 degrees to 15 degrees or in some embodiments up to 36 degrees.

According to a third aspect there is provided a hydrocyclone comprising a part-conical section according to the first aspect and a spigot according to the second aspect.

The hydrocyclone may further comprise an upper chamber from which the part-conical section depends. The upper chamber may comprise a cylindrical external surface and may define a helical formation on an inside surface. The helical formation may be defined by a removable liner located in the upper chamber. The helical formation may extend around a radial angle of 300 degrees, 330 degrees, 350 degrees or higher. The helical portion may form a spiral having nearly a 360° spin when viewed from above.

The hydrocyclone may further comprise a conventional frusto-conical section comprising an internal passageway tapering substantially continuously along the entire length of the frusto conical section and being coupled at a lower end to the part-conical section according to the first aspect.

The hydrocyclone may further comprise a plurality of conventional frusto-conical sections mounted, in use, above the part-conical section according to the first aspect.

By virtue of this aspect a part-conical section comprises (i) a first stage extending from the upper end to a second stage, in which the passageway narrows in diameter as it approaches the second stage, and (ii) the second stage in which the passageway extends in a generally uniform diameter from the first stage to the lower end.

The hydrocyclone may further comprise an overflow outlet control chamber located at a top wall of the feed inlet and in fluid communication therewith via the overflow outlet.

According to a fourth aspect there is provided a part-conical section for use as part of a separation chamber of a hydrocyclone, the part-conical section comprising: an upper end defining internal and external diameters and including an upper mount; a lower end defining smaller internal and external diameters than the upper end, and including a lower mount; and a sidewall defining an internal passageway along a fluid transport axis from the upper end to the lower end and defining a radially-inward tapering portion and a non-inwardly-tapering portion near the lower end, wherein the sidewall is thicker near the lower end than near the upper end.

The part conical section may further comprise an external surface defined by the sidewall.

According to a fifth aspect there is provided a separation chamber comprising a plurality of part-conical sections according to the first aspect; wherein adjacent part-conical sections are coupled end to end.

The part-conical sections preferably form a continuous internal sidewall defining an internal passageway of generally narrowing diameter from a cylindrical chamber to which an upper part-conical section is coupled to near an underflow outlet.

Optionally, adjacent part-conical sections define a step transition of the continuous internal sidewall from one part-conical section to the adjoining part-conical section.

These and other aspects of the present invention will become apparent from the following specific description, given by way of example only, with reference to the accompanying drawings, in which.

Figure 1:
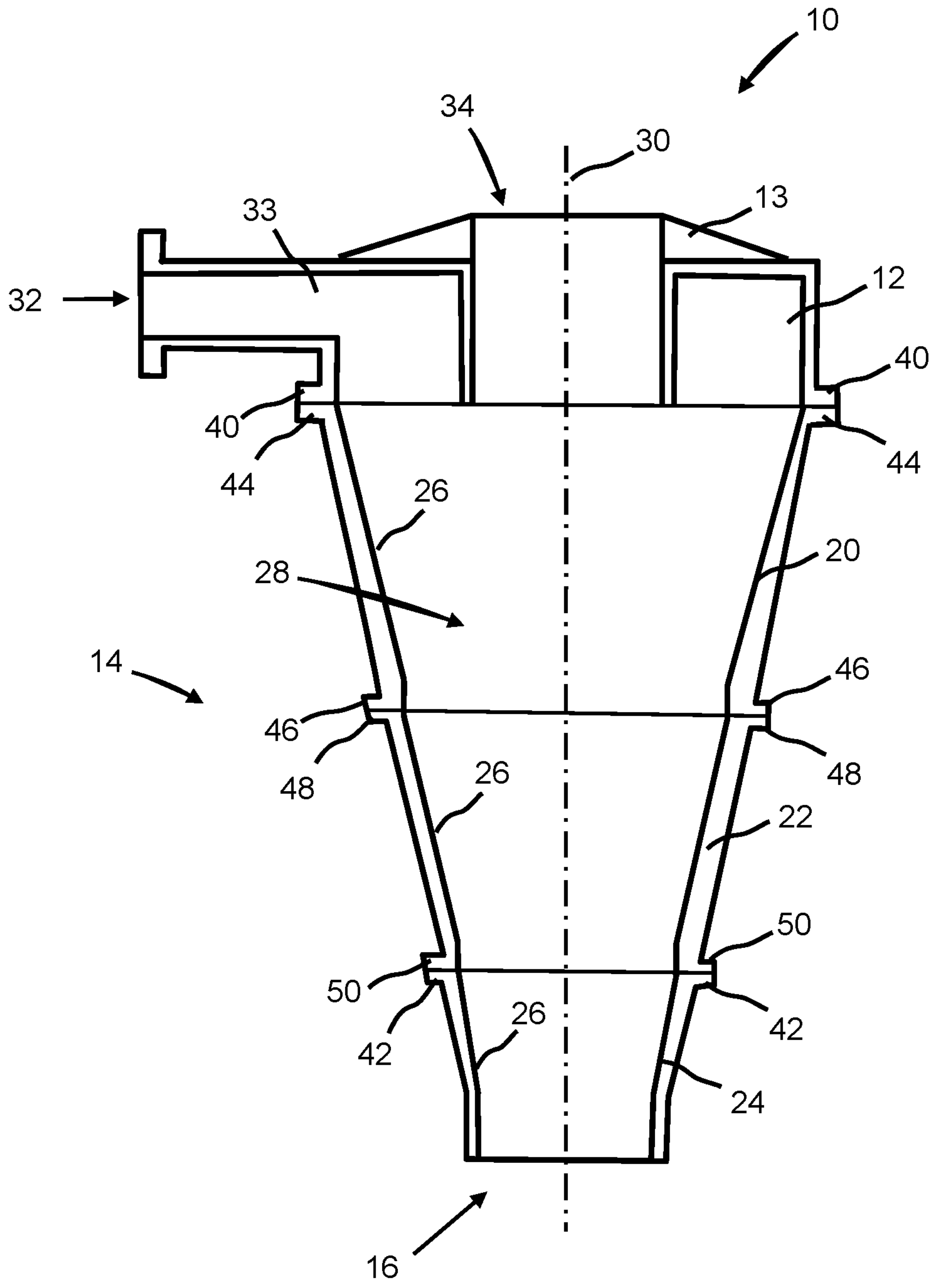
FIG. 1 is a simplified schematic cross-sectional diagram of a hydrocyclone according to a first embodiment of the present invention.
Figure 2:
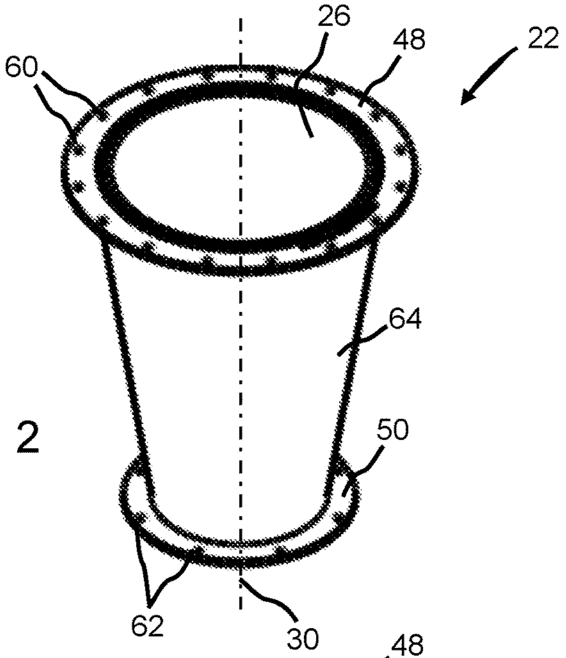
FIG. 2 is a perspective view of a part (a part-conical section) of the hydrocyclone of FIG. 1.
Figure 3:
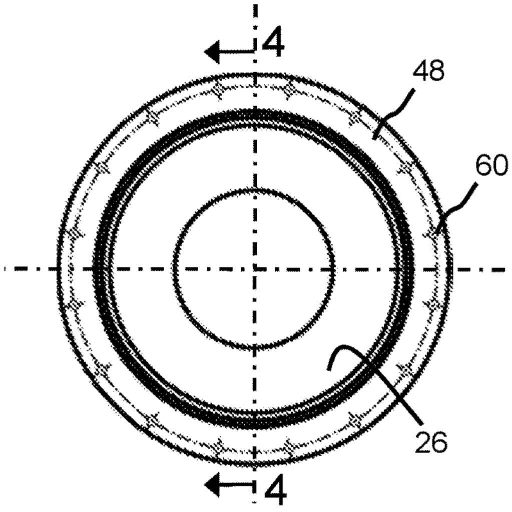
FIG. 3 is a (top) plan view of the part-conical section of FIG. 2.

Reference is first made to FIG. 1, which is a simplified schematic cross-sectional diagram of a hydrocyclone 10 according to one embodiment of the present invention. For purposes of clarity and legibility, FIG. 1 does not include any shading. The hydrocyclone 10 comprises: a generally cylindrical (the external surface) upper chamber 12 at an upper end thereof, an overflow cap 13 (also referred to as a vortex finder) mounted on an upper surface of the cylindrical chamber 12, and a separation chamber 14 extending from a lower surface of the cylindrical chamber 12 to an outlet end 16.

The separation chamber 14 comprises a plurality of part-conical sections 20, 22 (two are illustrated in this embodiment, although a greater or smaller number of sections than two may be used) coupled end to end and terminating with a spigot 24 at the outlet end 16 (also referred to as the underflow outlet). The part-conical sections 20,22 and spigot 24 form a continuous internal sidewall 26 defining an internal passageway 28 of generally narrowing diameter from the cylindrical chamber 12 to near the underflow outlet 16.

The separation chamber 14 defines a longitudinal (separation chamber) axis 30, also referred to as its central axis or a fluid transport axis. A feed inlet 32 is provided generally tangential to the longitudinal axis 30 and extending from the cylindrical chamber 12. An overflow outlet 34 comprises an aperture defined by the overflow cap 13 at an upper end of the cylindrical chamber 12.

The feed inlet 32 is configured to allow slurry (liquid containing suspended matter) to be pumped therethrough and into contact with a liner 33 defining a helical formation that guides the slurry downwards and around an angle of almost 360 degrees to be delivered into the hydrocyclone separation chamber 14 to create one or more vortices therein and an air core.

In use, hydrocyclone 10 is typically oriented as shown in FIG. 1 with its longitudinal axis 30 disposed in a generally upright orientation. However, in some embodiments, a cluster of hydrocyclones may be provided, with each hydrocyclone being disposed at an angle so that the underflow outlets 16 are all in close proximity disposed in a ring formation and the overflow outlets 34 are relatively further apart. Other embodiments may orient the hydrocyclone 10 in a more horizontal than vertical orientation, depending on the application for which the hydrocyclone 10 is used.

The cylindrical chamber 12 defines a circumferential flange 40 at a lower end thereof; the spigot 24 defines a circumferential flange 42 at an upper end thereof, and each of the two part-conical sections 20,22 defines two circumferential flanges (44,46 and 48,50 respectively) at opposite ends thereof.

The upper part-conical section 20 includes an upper mount 44 in the form of an upper flange for coupling to the cylindrical chamber flange 42; and a lower mount 46 in the form of a lower flange for coupling to an upper flange 48 of the lower part-conical section 22. Similarly, the lower part-conical section 22 includes the upper flange 48 (for coupling to the lower flange 46) and a lower mount 50 in the form of a lower flange for coupling to the spigot flange 42. By providing these mating circumferential flanges, the cylindrical chamber 12, the part-conical sections 20,22, and the spigot 24 can all be coupled in an end-to-end manner and secured using bolts, screws, rivets, welds, a clamp, or any other convenient fixing (not shown in FIG. 1).

The size of the hydrocyclone 10 can be selected depending on the application, but typically the total height of the hydrocyclone 10 is in the range from approximately 0.8 m to approximately 5 m. The separation chamber 14 typically ranges in length from approximately 0.6 m to approximately 4.5 m; and in width between approximately 40 cm and approximately 1 m at the widest part, and between approximately 20 cm and approximately 60 cm at the narrowest part; although other embodiments may use dimensions outside of these.

In this embodiment, the hydrocyclone is approximately 3 m high from the top of the vortex finder 34 to the bottom of the spigot 24.

Reference is now made to FIGS. 2 to 5, which illustrate one of the part-conical sections (the lower one 22) in more detail. Although only the lower of the two part-conical sections is illustrated, the upper section 20 is similar to the lower section 22 in this embodiment. However, in other embodiments the upper section 20 may comprise a conventional continuously tapering cone section (alternatively, the lower section 22 may comprise a conventional continuously tapering cone section and the upper section 20 may be as shown in FIG. 1).

The lower part-conical section 22 comprises a plurality of apertures 60 in the upper flange 48 and a plurality of apertures 62 in the lower flange 50, through which bolts or screws may be inserted to secure the lower section 22 to the upper section 20 and the spigot 24, respectively. The apertures 62 may be threaded or a nut may be used to secure a bolt therethrough (or self-tapping screws may be used). The lower part-conical section 22 also comprises an external sidewall 64 that tapers continuously from the upper flange 48 to the lower flange 50, at an angle A of approximately 5 degrees relative to the fluid transport axis 30 (best seen in FIG. 4).

Figure 4:
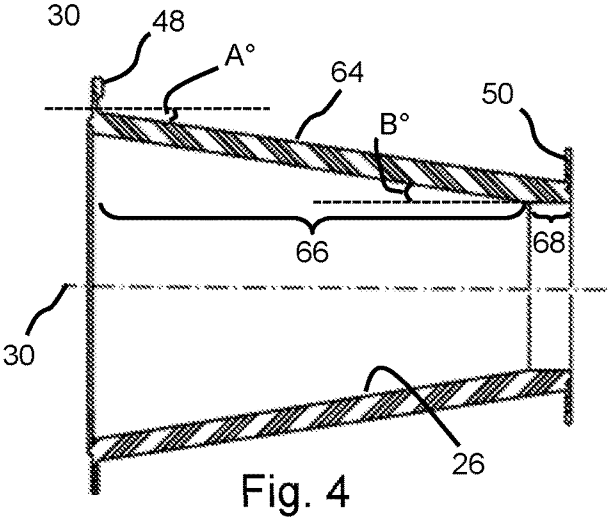
FIG. 4 is a cross-sectional elevation of the part-conical section of FIG. 2.
Figure 5:
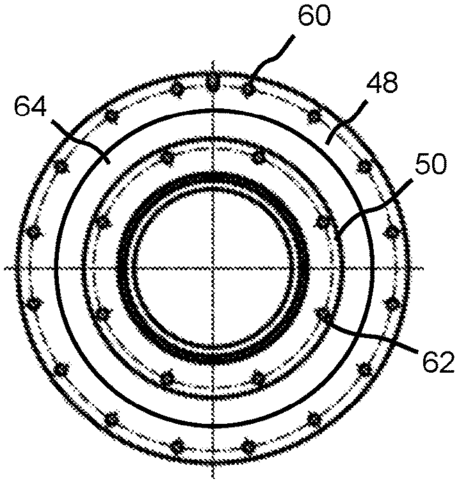
FIG. 5 is a (bottom) plan view of the part-conical section of FIG. 2.

As best seem in FIG. 4, the lower part-conical section 22 internal sidewall 26 comprises an inwardly tapered portion 66 and a non-inwardly-tapering portion 68 in the form of a generally uniform diameter portion 68 (also referred to as a cylindrical portion). The tapered portion extends at an angle B of approximately 7 degrees relative to the fluid transport axis 30 (although an angle of between 2 degrees and 8.5 degrees may be used in other embodiments). In this embodiment, the tapered portion 66 extends for approximately 60 cm (although for other embodiments this may conveniently be in the range from 24 cm to 1.13 m), and the generally uniform diameter portion 68 extends for approximately 18 cm (although for other embodiments this may conveniently be in the range from 25 cm to 1.85 m).

Figures 6, 7:
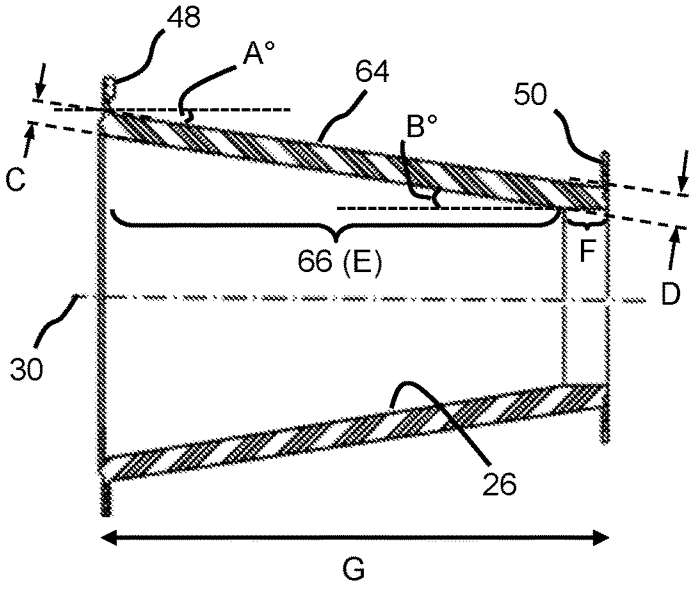
FIG. 6 is the cross-sectional elevation of FIG. 4, but with letters added for reference.
FIG. 7 is table illustrating various dimensions of the part-conical section of FIG. 6.

FIGS. 6 (which is the cross-sectional elevation of FIG. 4, but with letters added for reference) and 7 (which is a table using the reference letters shown in FIG. 6), illustrate suitable dimension combinations that may be used in other embodiments.

Slurry typically increases in velocity as it travels through narrower sections of a cone. By providing a generally uniform diameter width (i.e. a cylindrical zone) at the narrowest part of the part-conical section, this avoids the increase of velocity and reduces wear over time, thereby increasing the lifetime of the part-conical section. This also improves fluid dynamics and avoids excess turbulence, thereby increasing performance of the hydrocyclone 10.

Figure 8:
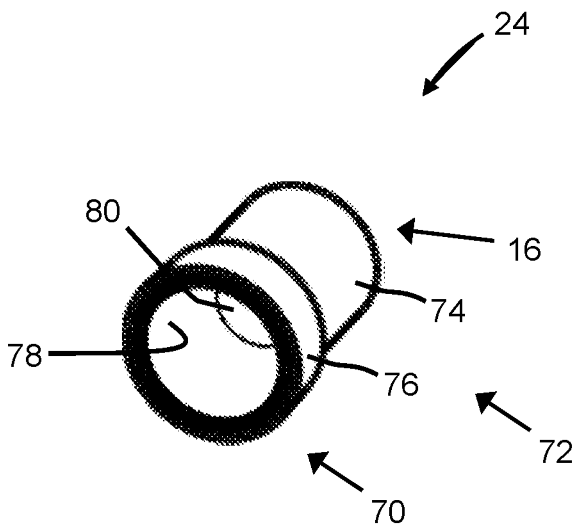
FIG. 8 is a perspective view of another part (a spigot) of the hydrocyclone of FIG. 1.
Figure 9:
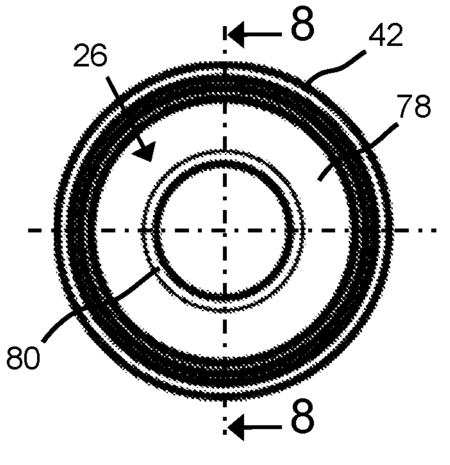
FIG. 9 is a (top) plan view of the spigot of FIG. 8.
Figure 10:
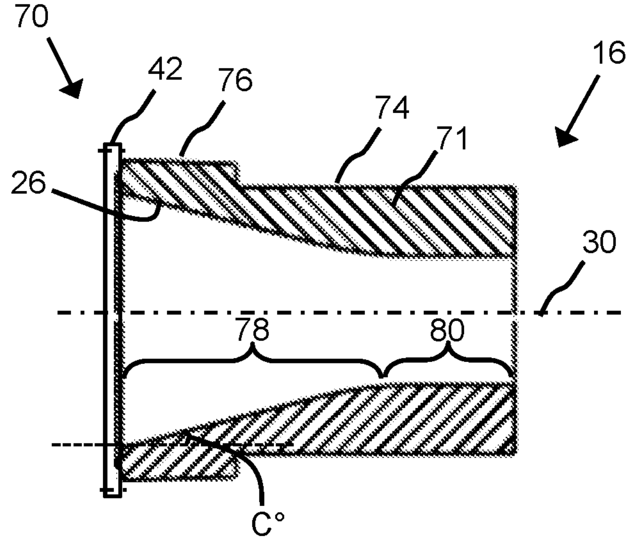
FIG. 10 is a cross-sectional elevation of the spigot of FIG. 8.

Reference is now made to FIGS. 8 to 10, which illustrate the spigot 24 in more detail (although not to scale). The spigot 24 comprises the outlet end 16, an upper end 70, and an annular sidewall 71 defining a stepped external surface 72 extending between these two ends 16,70. The external surface 72 comprises a narrow collar portion 74 of generally uniform diameter and extending from the outlet end towards the upper end 70, and a wide collar portion 76 of generally uniform diameter and extending from the upper end 70 to the outlet end 16. In this embodiment, the diameter of the narrow collar portion 74 is approximately 30 cm; and the diameter of the wide collar portion 76 is approximately 40 cm.

The spigot sidewall 71 defines a first internal portion 78 having a continuous inward taper relative to the fluid transport axis 30 to reduce the diameter of the internal passageway 28 in this region. In this embodiment, the first internal portion 78 extends for the entire length of the wide collar portion 76 and for part of the narrow collar portion 74. The total length of the first internal portion 78 is 35 cm. The spigot sidewall 71 also defines a second internal portion 80 having a generally uniform diameter relative to the fluid transport axis 30 and extending from an end of the first internal portion 78 to the fluid outlet end 16. The total length of the second internal portion 80 is 25 cm.

The first internal portion 78 (which is the tapered portion of the spigot 24) extends at an angle C of approximately 8 degrees relative to the fluid transport axis 30.

The width of the annular sidewall 71 varies along the fluid transport axis 30 such that the sidewall 71 is thickest around the second internal portion 80, which is where most of the wear at the spigot 24 typically occurs.

Referring again to FIG. 1, during operation of the hydrocyclone 10, slurry is pumped into the feed inlet 32 under pressure and is deflected by the feed inlet liner 33 in the cylindrical chamber 12, causing the slurry to swirl around the inside of the hydrocyclone 10. The swirling motion produces a slurry vortex and an internal air core down the centre of the hydrocyclone 10 surrounded by the slurry vortex.

During stable operation, the hydrocyclone 10 operates such that a lighter solid phase of the slurry is carried inwards and upwards in a helical motion to the top of the hydrocyclone 10 and is discharged through the uppermost overflow outlet (the vortex finder 34). Large, heavy particles move outwards and downwards in a helical motion to the bottom and are discharged through the outlet end 16 at the spigot 24.

Figures 11, 12:
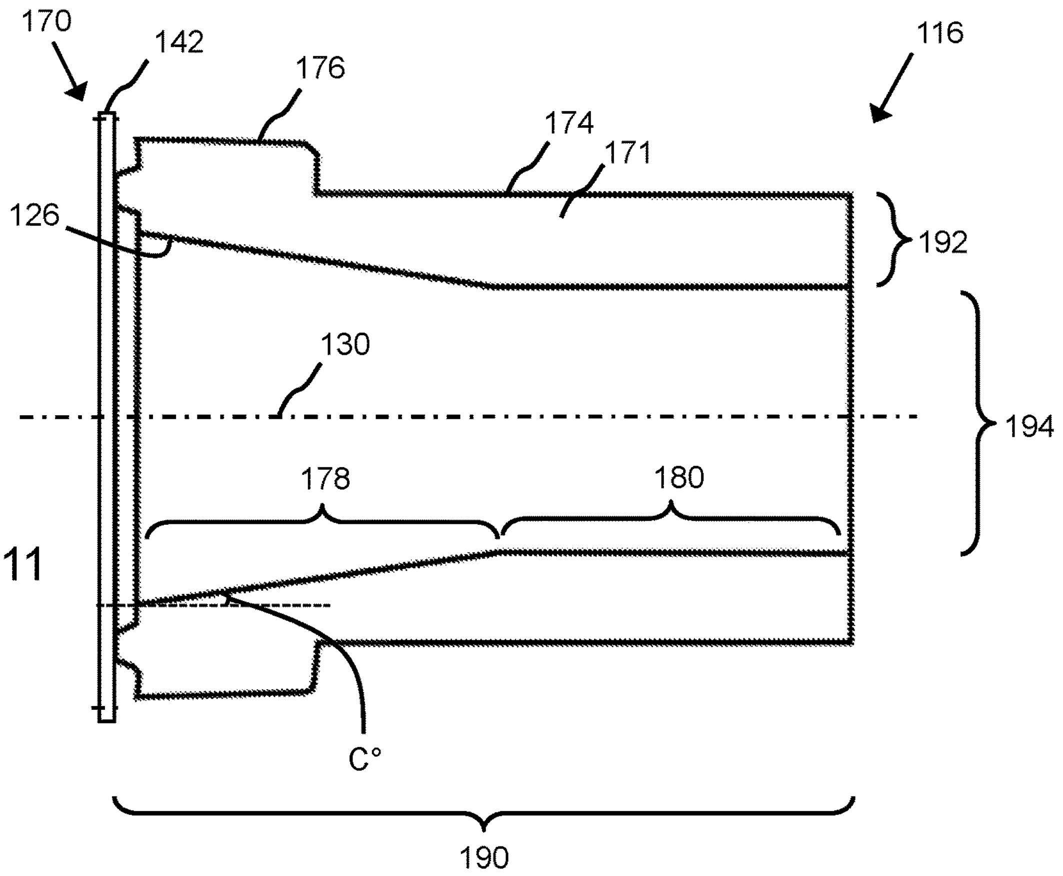
FIG. 11 is a simplified cross-sectional elevation of an alternative spigot.
FIG. 12 is a table illustrating various dimensions of the alternative spigot of FIG. 11.

Reference is now made to FIG. 11, which is a simplified cross-sectional view (with no shading) of an alternative spigot 124 (generally corresponding to the FIG. 10 view of spigot 24). Corresponding parts in FIG. 11 are shown with the numeral "1" in front, e.g. circumferential flange 142 corresponds to circumferential flange 42.

The length of second internal portion 180 can be selected from the range 35 mm to 287 mm. The length of the internal passage 190, which corresponds to the sum of the lengths of the internal portions 178, 180, can be selected from the range 160 mm to 517 mm. The ratio of the length of the second internal portion 180 to the length of the internal passage 190 can be selected from the range 16% to 64%.

In spigot 124, angle C is approximately 9 degrees, but can be selected from the range 8 degrees to 19 degrees.

The narrow collar portion 174 wall thickness 192 can be selected from the range of 20 mm to 110 mm.

The diameter of the outlet end 16 (outlet diameter 194) can be selected from the range 10 m to 260 mm.

Typical sizes of the second internal portion 180, internal passage length 190, collar wall thickness 192, and outlet diameter 194, (all in mm) are shown in FIG. 12, together with a typical value of angle C.

In the foregoing description of certain embodiments, specific terminology has been used for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms, nor to imply a required orientation of the hydrocyclone 10.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combined with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive. For example, the separation chamber of the hydrocyclone may be made up of more than two part-conical segments, joined end-to-end. The means by which such part-conical segments are joined to one another may not merely be via bolts and nuts positioned at the edges of terminal flanges, but by other types of fastening means, such as some type of external clamp.

The materials of construction of the hydrocyclone body parts (such as the part-conical sections 20,22, the spigot 24, and the cylindrical chamber 12), whilst typically made of hard plastic, metal, or alloy can also be of other materials such as ceramics or elastomers (with or without structural reinforcement) to provide improved resistance to wear caused by the slurry being separated. In other embodiments, the part-conical sections 20,22 and the spigot 24 may include liner portions to provide improved resistance to wear caused by the slurry being separated. The liner portions may comprise a ceramic, an elastomer, or a composite (ceramic, metal, alloy, elastomer, and/or fibre material, such as a natural or synthetic fibre). Such liner portions may be formed into any desired internal shape geometry for the cylindrical chamber 12 or the separation chamber 14.

In other embodiments a clamp may be used to secure the circumferential mating flanges instead or, or in addition to, bolts.

Furthermore, the inventions have been described in connection with what are presently considered to be the most practical and preferred embodiments, it is to be understood that the invention is not to be limited to the disclosed embodiments, but on the contrary, is intended to cover various modifications and equivalent arrangements included within the scope of the inventions. Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

Dimensions and angles provided in the embodiments are given by way of example only, to enable the skilled person to understand the embodiments more fully.

LIST OF REFERENCE NUMERALS AND CORRESPONDING FEATURES hydrocyclone 10
upper (cylindrical) chamber 12
overflow cap (vortex finder) 13
separation chamber 14
outlet end 16, 116
part-conical sections 20, 22
spigot 24, 124
internal sidewall 26, 126
internal passageway 28
longitudinal (central) axis 30, 130
feed inlet 32
liner 33
overflow outlet 34
circumferential flange 40
circumferential (cylindrical chamber) flange 42, 142
part-conical sections circumferential flanges 44,46 and 48,50
upper part-conical section upper mount (flange) 44
upper part-conical section lower mount (flange) 46
lower part-conical section upper mount (flange) 48
lower part-conical section lower mount (flange) 50
upper flange apertures 60
lower flange apertures 62
inwardly tapered portion 66
non-inwardly-tapering portion 68
spigot upper end 70, 170
spigot annular sidewall 71, 171
spigot external surface 72
narrow collar portion 74, 174
wide collar portion 76, 176
spigot sidewall first internal portion 78, 178
spigot sidewall second internal portion 80, 180
total internal portion length 190 narrow collar portion wall thickness 192
outlet end outlet diameter 194

The invention claimed is:

1. A part-conical section, which is not a spigot, for use as part of a separation chamber of a hydrocyclone, the part-conical section comprising:

an upper end defining internal and external diameters and including an upper mount for coupling the part-conical section to a cylindrical fluid input portion of the hydrocyclone;

a lower end defining smaller internal and external diameters than the upper end, and including a lower mount for coupling the part-conical section to either another part-conical section or a spigot of the hydrocyclone;

a sidewall defining an internal passageway along a fluid transport axis and an external surface, the sidewall thickness at the upper end being narrower than the sidewall thickness at the lower end;

wherein the internal passageway extends from the upper end to the lower end, defining a radially-inward tapering portion with respect to the fluid transport axis, and a non-inwardly-tapering portion with respect to the fluid transport axis, the radially-inward tapering portion extending from the upper end of the part-conical section to an upper end of the non-inwardly-tapering portion, and the non-inwardly-tapering portion extending from a narrow end of the radially-inward tapering portion to the lower end, and wherein the sidewall thickness at the upper end of the radially-inward tapering portion is narrower than the sidewall thickness at the upper end of the non-inwardly tapering portion.

2. The part-conical section according to claim 1, wherein the non-inwardly-tapering portion comprises at least 3% of the length of the internal passageway along the fluid transport axis.

3. The part-conical section according to claim 1, wherein the non-inwardly-tapering portion comprises between 3% and 24% of the length of the internal passageway along the fluid transport axis.

4. The part-conical section according to claim 1, wherein the sidewall external surface tapers inwardly and continuously from the upper end to a start of the lower end.

5. The part-conical section according to claim 1, wherein the sidewall external surface comprises one or more steps from the upper end to the lower end.

6. The part-conical section according to claim 1, wherein the sidewall at the lower end is at least 5% thicker than the sidewall thickness at the upper end.

7. The part-conical section according to claim 1, wherein an angle A between the sidewall external surface and a line parallel to the fluid transport axis is less than an angle B between the radially-inward tapering portion of the internal passageway and the line parallel to the fluid transport axis, thereby ensuring that the sidewall thickness increases as the sidewall extends towards the lower end.

8. The part-conical section according to claim 7, wherein Angle A is an angle selected from the range of 2 degrees to 9 degrees.

9. The part-conical section according to claim 7, wherein Angle B is an angle selected from the range of 3 degrees to 9 degrees.

10. The part-conical section according to claim 1, wherein the part-conical section comprises one or more materials selected from the following materials: an elastomer, a ceramic, a metal, an alloy, or a composite.

11. The part-conical section according to claim 1, wherein the part-conical section comprises one or more liners.

12. The part-conical section according to claim 11, wherein the liner comprises an elastomer or a ceramic.

13. The part-conical section according to claim 1, wherein the non-inwardly-tapering portion comprises a cylindrical portion.

14. A spigot for use as part of a separation chamber of a hydrocyclone, the spigot comprising:

an upper end defining an internal diameter and including an upper mount for coupling to a section of a hydrocyclone in an end-to-end manner;

an underflow outlet end having a smaller internal diameter than the upper end;

a spigot sidewall defining an internal passageway along a fluid transport axis and an external surface comprising a narrow collar portion of generally uniform diameter and extending from the outlet end towards the upper end, and a wide collar portion of generally uniform diameter and extending from the upper end to the narrow collar portion;

wherein the internal passageway extends from the upper end to the underflow outlet end and defines: (i) a radially-inward tapering portion with respect to the fluid transport axis extending for the entire length of the wide collar portion and for part of the narrow collar portion, and (ii) a non-inwardly-tapering portion having a generally uniform diameter with respect to the fluid transport axis, the radially-inward tapering portion extending from the upper end to the non-inwardly-tapering portion, and the non-inwardly-tapering portion extending from a narrow end of the radially-inward tapering portion to the underflow outlet end; wherein the non-inwardly-tapering portion comprises at least 30% of the length of the internal passageway along the fluid transport axis.

15. The spigot according to claim 14, wherein the non-inwardly-tapering portion comprises at least 35% of the length of the internal passageway along the fluid transport axis.

16. The spigot according to claim 14, wherein the angle between the spigot internal passageway and a line parallel to the fluid transport axis is selected from the range of 8 degrees to 36 degrees.

17. A hydrocyclone comprising a part-conical section, which is not a spigot, for use as part of a separation chamber of a hydrocyclone, the part-conical section comprising:

an upper end defining internal and external diameters and including an upper mount for coupling the part-conical section to a cylindrical fluid input portion of the hydrocyclone;

a lower end defining smaller internal and external diameters than the upper end, and including a lower mount for coupling the part-conical section to either another part-conical section or a spigot of the hydrocyclone;

a sidewall defining an internal passageway along a fluid transport axis and an external surface, the sidewall thickness at the upper end being narrower than the sidewall thickness at the lower end;

wherein the internal passageway extends from the upper end to the lower end and defines a radially-inward tapering portion with respect to the fluid transport axis, and a non-inwardly-tapering portion with respect to the fluid transport axis, the radially-inward tapering portion extending from the upper end, and having a narrower sidewall thickness thereat, to the non-inwardly-tapering portion, and the non-inwardly-tapering portion extending from a narrow end of the radially-inward tapering portion, where the sidewall thickness of the radially-inward tapering portion is thicker than the narrower sidewall thickness at the upper end, to the lower end; and a spigot comprising:

an upper end defining an internal diameter and including an upper mount;

an underflow outlet end having a smaller internal diameter than the upper end;

a spigot sidewall defining an internal passageway along a fluid transport axis and an external surface comprising a narrow collar portion of generally uniform diameter and extending from the outlet end towards the upper end, and a wide collar portion of generally uniform diameter and extending from the upper end to the narrow collar portion;

wherein the internal passageway of the spigot extends from the upper end to the underflow outlet end and defines: (i) a radially-inward tapering portion with respect to the fluid transport axis extending for the entire length of the wide collar portion and for part of the narrow collar portion, and (ii) a non-inwardly-tapering portion having a generally uniform diameter with respect to the fluid transport axis, the radially-inward tapering portion extending from the upper end to the non-inwardly-tapering portion, and the non-inwardly-tapering portion extending from a narrow end of the radially-inward tapering portion to the underflow outlet end; wherein the non-inwardly-tapering portion comprises at least 30% of the length of the internal passageway along the fluid transport axis.

18. The hydrocyclone according to claim 17, further comprising a cylindrical chamber from which the part-conical section depends.

19. The hydrocyclone according to claim 17, wherein the part-conical section includes an elastomer liner.

* * * * *